July 19, 1966   R. CLAAS   3,261,362
HURDLE TYPE STRAW SHAKER FOR COMBINE HARVESTERS
Filed June 27, 1963

INVENTOR
Reinhold Claas
by
Michael S. Striker

United States Patent Office 3,261,362
Patented July 19, 1966

3,261,362
HURDLE TYPE STRAW SHAKER FOR
COMBINE HARVESTERS
Reinhold Claas, 64 August Claas Strasse,
Harsewinkel, Westphalia, Germany
Filed June 27, 1963, Ser. No. 290,976
Claims priority, application Germany, Jan. 9, 1963,
C 28,865
1 Claim. (Cl. 130—26)

This invention relates to straw shakers, and more specifically to a hurdle type straw shaker for combine harvesters of the kind including a collecting tray arrangement which is provided with covering means having openings through which grain separated out from straw being fed thereover can drop on to the collecting tray and be fed to a cleaning device.

The known hurdle type straw shakers consist of a plurality of shaker members each provided with an individual collecting tray, and of a common cleaning device including a preparing bottom and sifting means having an associated blower.

In these known shakers there is the risk that when the combine harvester is moving on sloping ground, this will lead to unequal loading of individual regions of the width of the cleaning device, for in the region of the marginal zone of the cleaning device and especially of the preparing bottom thereof, which when moving on a slope is located at a lower level, there will occur accumulations of grain by which the task of satisfactorily separating the chaff and the like from the grain is rendered difficult.

It is the object of the present invention to construct straw shakers of the intially described kind, which are used with combine harvesters in such a manner that the cleaning device, owing to being uniformly loaded, will operate with a maximum degree of efficiency even when the combine harvester is moving on a slope.

This object is substantially attained by the provision of a hurdle type straw shaker for a combine harvester which comprises a plurality of shaker members in side-by-side arrangement and each including a collecting tray and covering means for, and extending over the whole area of, the respective collecting tray, said covering means having openings through which grain separated out from straw being fed over said covering means can drop on to the respective subjacent collecting tray in order to be fed to a cleaning device arranged below said shaker members for receiving from each collecting tray via respective outlet zones thereof the separated grain, said outlet zones of the collecting trays having side walls of which the ones adjacent the side walls of the housing of the combine harvester for the purpose of charging mainly the central area of said cleaning device are displaced towards the longitudinal centre line of said cleaning device.

This design ensures that the grain fed from the outlet zones of the collecting trays on to the preparing bottom of the cleaning device is substantially uniformly distributed over the width of this preparing bottom even when the combine harvester moves on a slope, so that the cleaning device also in this case can operate with a maximum degree of efficiency.

Although in the construction proposed by the invention the overall width of the outlet area of the combined collecting trays is smaller than the total width of the adjacent shaker members, this feature does not by any means impair the efficiency of the hurdle type straw shaker.

The invention can be realized in many ways. According to a very expedient embodiment, the side walls of the outlet zones of the collecting trays may extend obliquely towards the longitudinal centre line of the housing of the combine harvester, with respect to the plane of swinging of the shaker members. In this form of construction the grain to be fed to the cleaning device will be gradually guided from the outer marginal zones towards the centre so that there is no danger of obstructions.

In some cases, however, it will also be sufficient to maintain substantially the known constructions and to provide merely the outer marginal regions of the outlet zones with guide or baffle plates which keep the grain off the marginal zones of the cleaning device at least when working on flat ground.

In the conventional hurdle type shakers the outlet zones of the collecting trays associated with the outer shaker member may be arranged so that their longitudinal centre lines extend at an acute angle obliquely towards the longitudinal centre lines of said outer shaker members. The central shaker members might be constructed as usual but for the purpose of obtaining a uniform distribution of the grain it would also in this case be advantageous to direct the longitudinal centre lines of the outlet zones of the collecting trays towards the centre line of the housing of the combine harvester, the degree of obliquety, however, being smaller than that of the outlets of the collecting trays belonging to the outer shaker members.

A preferred embodiment of the invention will now be described by way of example and with reference to the accompanying drawing, in which.

Figure 1:
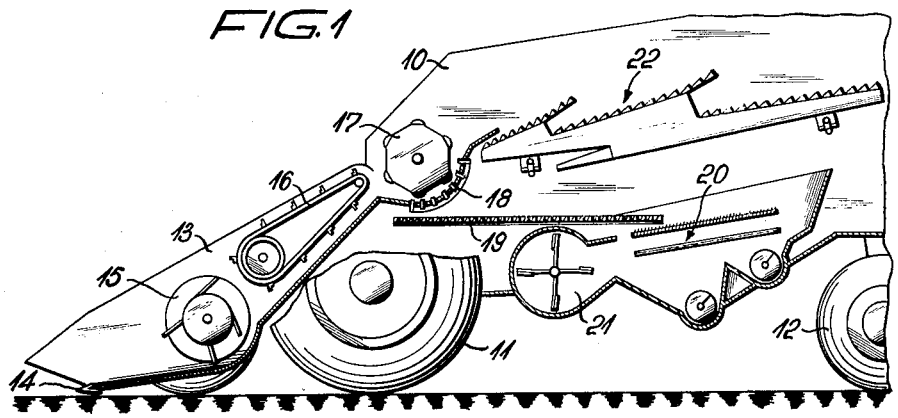
FIG. 1 is a schematic longitudinal section through the part of a combine harvester with which the hurdle type straw shaker according to the invention is associated.

FIG. 1 shows part of a combine harvester having a housing 10 which is supported on driving wheels 11 and steering wheels 12. The leading end of the combine harvester is provided with a cutter table 13 including a cutting mechanism 14, a feed auger 15 disposed therebehind, and an elevator 16 which serves to convey the grain to be threshold to the threshing mechanism. The threshing mechanism comprises a threshing drum 17 and a concave 18. For receiving the grain separated by the concave 18, a preparing bottom 19 is provided from which the grain will pass on to sifting means 20 having an associated blower 21. The preparing bottom 19, the sifting means 20 and the blower 21 form a complete cleaning device. The straw leaving the outlet of the threshing gap between the threshing drum 17 and the concave 18 will be thrown on to a shaker 22 for separating out the grain still present in the straw.

Figure 2:
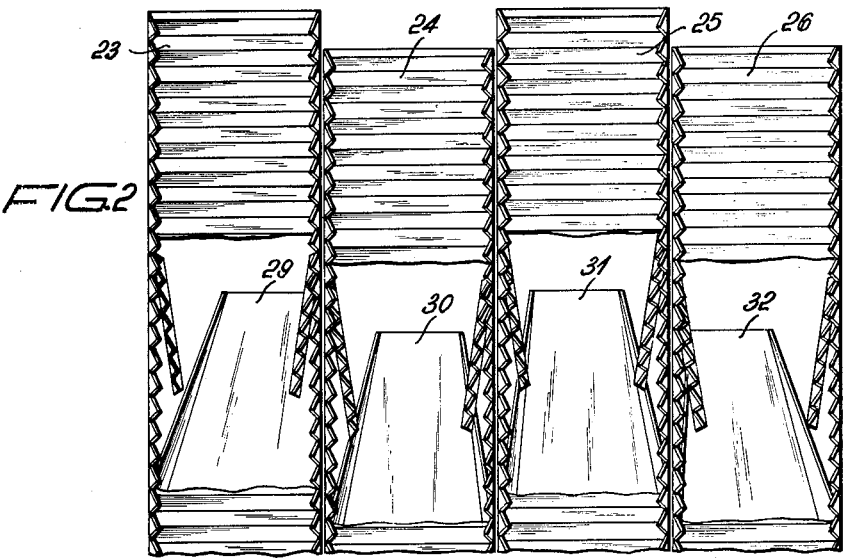
FIG. 2 is a top plan view of part of the hurdle type shaker.
Figure 3:
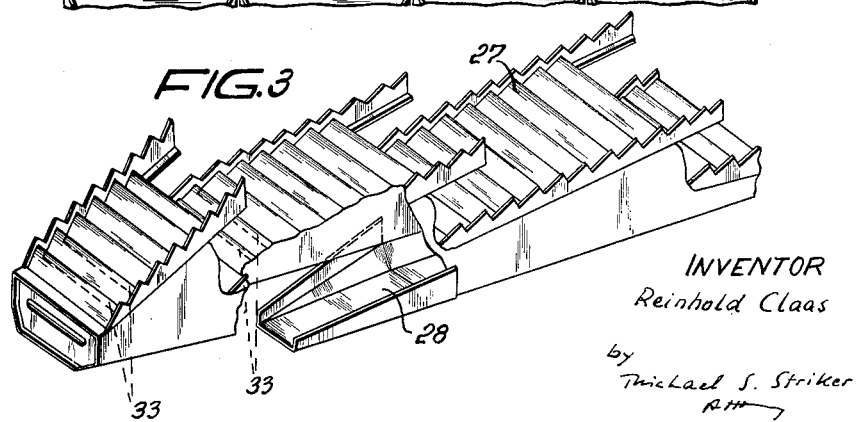
FIG. 3 is a perspective view of one of the hurdles forming the hurdle type shaker.

In the illustrated embodiment the shaker 22 is designed as a hurdle type shaker and comprises four shaker members 23, 24, 25 and 26 arranged side by side as can be seen from FIG. 2. As shown in FIG. 3, each of the shaker members 23, 24, 25 and 26 is provided with known covering means 27 extending over a collecting tray 28 and having openings for the passage therethrough of the grain separated from the straw. The collecting tray 28 is arranged with clearance below the covering means 27 and provided with an outlet zone from which the grain can drop onto the central longitudinal zone of the preparing bottom 19. The shaker members 23 to 26 may be identical with respect to their covering means 27 but they have different outlet zones 29, 30, 31 and 32 for conveying the grain to the cleaning device. In the illustrated embodiment the longitudinal centre lines of the outlet zones 29 and 32 of the outer shaker members 23 and 26 extend with such a degree of obliquity towards the longitudinal centre lines of the associated central shaker members 24 and 25 that the grain delivered is not allowed to excessively accumulate near a side wall of the cleaning device or of the preparing bottom 19, even when the combine harvester is moving on sloping ground. In the interest of a uniform distribution of the grain over the width of the delivery zone, which due to the obliquity of the outlet zones 29 and 32 of the outer shaker members 23 and 26 is narrower than the width of the preparing bottom 19, it is advisable to provide also for the longitudinal centre lines of the outlet zones 30 and 31 to extend at a relatively small obliquity with respect to the longitudinal centre line of the housing 10 of the combine harvester. However, this is not an absolute requirement, and the longitudinal centre lines of the outlet zones 30 and 31 of the central shaker members 24 and 25 may extend also parallel to the longitudinal centre lines of these shaker members or to the longitudinal centre line of the housing 10 of the combine harvester.

I claim:

In a combine harvester including a housing having a pair of side walls extending in the direction of movement of the combine harvester, in combination, cleaning means extending between said side walls; a hurdle type straw shaker arranged above said cleaning means and comprising a plurality of shake members arranged side by side between said side walls and each including a collecting tray and covering means for and extending over the whole area of, the respective collecting tray, said covering means having openings through which grain separated from straw fed over said covering means can drop onto the respective subjacent collecting tray in order to be fed to said cleaning means, each of said collecting trays having a rear end at a higher elevation than a front end thereof and each of said collecting trays having a pair of spaced side walls, the spacing between the side walls of each tray tapering from said rear towards said front end and the side walls of each tray closer to the respective side wall of said housing extending at a greater angle to a longitudinal plane of symmetry to said housing than the other side wall of each tray, so that, even when said combine harvester tilts during its travel in a direction transverse to its movement, a substantially even distribution of the grain over the width of said cleaning means is obtained.

References Cited by the Examiner

UNITED STATES PATENTS 2,937,647    5/1960    Allen et al. _____ 130—24 X

FOREIGN PATENTS 519,735    3/1949    Great Britain.

ABRAHAM G. STONE, *Primary Examiner.*

T. GRAHAM CRAVER, ANTONIO F. GUIDA,
*Examiners.*

J. O. BOLT, JR., *Assistant Examiner.*